US011104101B2

(12) United States Patent
Larsen

(10) Patent No.: US 11,104,101 B2
(45) Date of Patent: Aug. 31, 2021

(54) SYSTEMS AND METHODS FOR SEALING AN AIRBAG INFLATOR BASE

(71) Applicant: Autoliv ASP, Inc., Ogden, UT (US)

(72) Inventor: Alan R. Larsen, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 162 days.

(21) Appl. No.: 16/400,889

(22) Filed: May 1, 2019

(65) Prior Publication Data

US 2020/0346434 A1 Nov. 5, 2020

(51) Int. Cl.

*B60R 21/26* (2011.01)
*B32B 7/12* (2006.01)
*F16J 15/02* (2006.01)
*B60R 21/264* (2006.01)

(52) U.S. Cl.

CPC ............ *B32B 7/12* (2013.01); *B60R 21/2644* (2013.01); *F16J 15/022* (2013.01); *B60R 2021/26029* (2013.01)

(58) Field of Classification Search

CPC .......... F16J 15/022; B60R 2021/26076; B60R 21/264; B60R 21/2644
USPC .......................................................... 277/922
See application file for complete search history.

(56) References Cited

U.S. PATENT DOCUMENTS 6,769,699 B2 * 8/2004 Seki ..................... G11B 33/121 277/628
6,830,641 B2 * 12/2004 Kosty .................. F16J 15/3228 156/221
7,516,701 B2 * 4/2009 Kurita ..................... B60R 21/26 102/530
8,083,259 B2 * 12/2011 Schonhuber ............ B60R 21/26 280/741
8,708,368 B2 * 4/2014 Ukita ...................... B60R 21/26 280/741
9,139,156 B2 * 9/2015 Bierwirth .................. F42B 3/04
9,656,626 B2 * 5/2017 Ohsugi ................... F42B 3/125
2005/0127649 A1 6/2005 Smith
2008/0022880 A1 * 1/2008 Bierwirth ............ B60R 21/2644 102/530
2011/0074120 A1 * 3/2011 Namey, Jr. ............. F16J 15/104 277/650
2013/0276664 A1 * 10/2013 Ohsugi .................... C06D 5/00 102/530
2017/0341617 A1 11/2017 Bierwirth et al.
2020/0189516 A1 * 6/2020 Weber ................. B60R 22/4628

FOREIGN PATENT DOCUMENTS

WO 2018198558 11/2018

OTHER PUBLICATIONS

International Search Report and Written Opinion dated Jun. 23, 2020 for international application PCT/US2020/929389.

* cited by examiner

*Primary Examiner* — Ruth Ilan
(74) *Attorney, Agent, or Firm* — Stoel Rives LLP

(57) ABSTRACT

Systems and methods are disclosed in which a seal is formed between an interior of an airbag inflator base and an exterior environment. A polymeric member of a membrane seal can form a solid state bond with an overmold of an electrical connector of an initiator of an airbag inflator. Furthermore, an adhesive film of the membrane seal can bond to the airbag inflator base at a position disposed at least partially around a recess through which the overmold couples an initiator to the airbag inflator base.

21 Claims, 8 Drawing Sheets

100
30
102
104
106
122
108
130
150
103
116
110
114
112

SYSTEMS AND METHODS FOR SEALING AN AIRBAG INFLATOR BASE

TECHNICAL FIELD

The present disclosure relates generally to the field of automotive protective systems. More specifically, the present disclosure relates to airbag systems that are configured to deploy in response to collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are, therefore, not to be considered limiting of the scope of the disclosure, the embodiments will be described and explained with specificity and detail in reference to the accompanying drawings.

DETAILED DESCRIPTION

Figure 1:
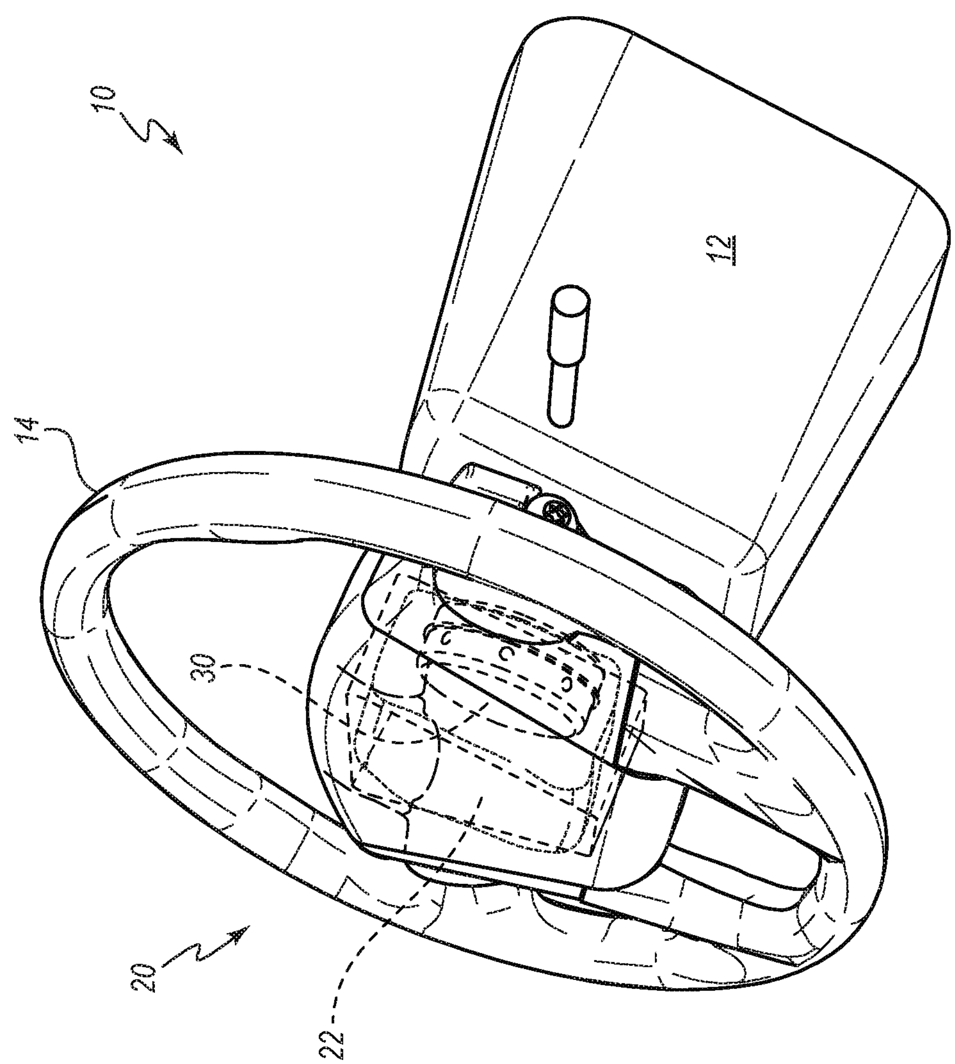
FIG. 1 is a perspective view of a steering wheel assembly of a vehicle having an inflatable airbag assembly, according to an embodiment of the present disclosure.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag assemblies are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position.

During installation, airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from a packaged state (e.g., a compact configuration) to a deployed state or an expanded configuration. The inflator may be triggered by an initiator which may be triggered by any suitable device or system, and the triggering may be in response to and/or influenced by one or more vehicle sensors.

A typical initiator may include a plurality of electrical conductors which may convey an electrical pulse to a pyrotechnic charge to cause the pyrotechnic charge to combust. Combustion of the pyrotechnic charge may cause a pyrotechnic relay charge to combust, and combustion of the pyrotechnic relay charge may, in turn, initiate combustion of propellant pellets. Combustion of the propellant pellets may generate a volume of gas which may be directed through a filter and a plurality of ports in a housing of the inflator whereby the inflation gas may be directed into the airbag such that the airbag rapidly expands and deploys.

Some embodiments disclosed herein can provide improved sealing of an aperture of an airbag inflator base through which the initiator may be coupled to an electrical harness of the vehicle to which the airbag assembly is installed. An embodiment of the present disclosure may create a seal, such as a hermetic seal, between the internal space of the airbag inflator base and the exterior environment so as to limit or prevent admittance of gas (e.g., air) or liquid (e.g., moisture) from the exterior environment into the internal space of the airbag inflator base. Preventing gas or liquid from entering the interior space of the inflator base may permit a chemically more stable environment for the pyrotechnic charge, pyrotechnic relay charge, propellants, filter(s), etc., so as to provide durability and reliable performance of the inflator.

FIG. 1 is a perspective view of a steering wheel assembly 10 of a vehicle having an inflatable airbag assembly 20. The steering wheel assembly 10 can include a steering column 12 and a steering wheel 14. The inflatable airbag assembly 20 can include an inflatable cushion 22 and an inflator 30. The inflatable airbag may be disposed in a packaged state within a housing within the steering wheel 14 (or other component) within a passenger compartment of the vehicle, and may deploy from the housing to a deployed state to provide protection for an occupant.

Figure 2:
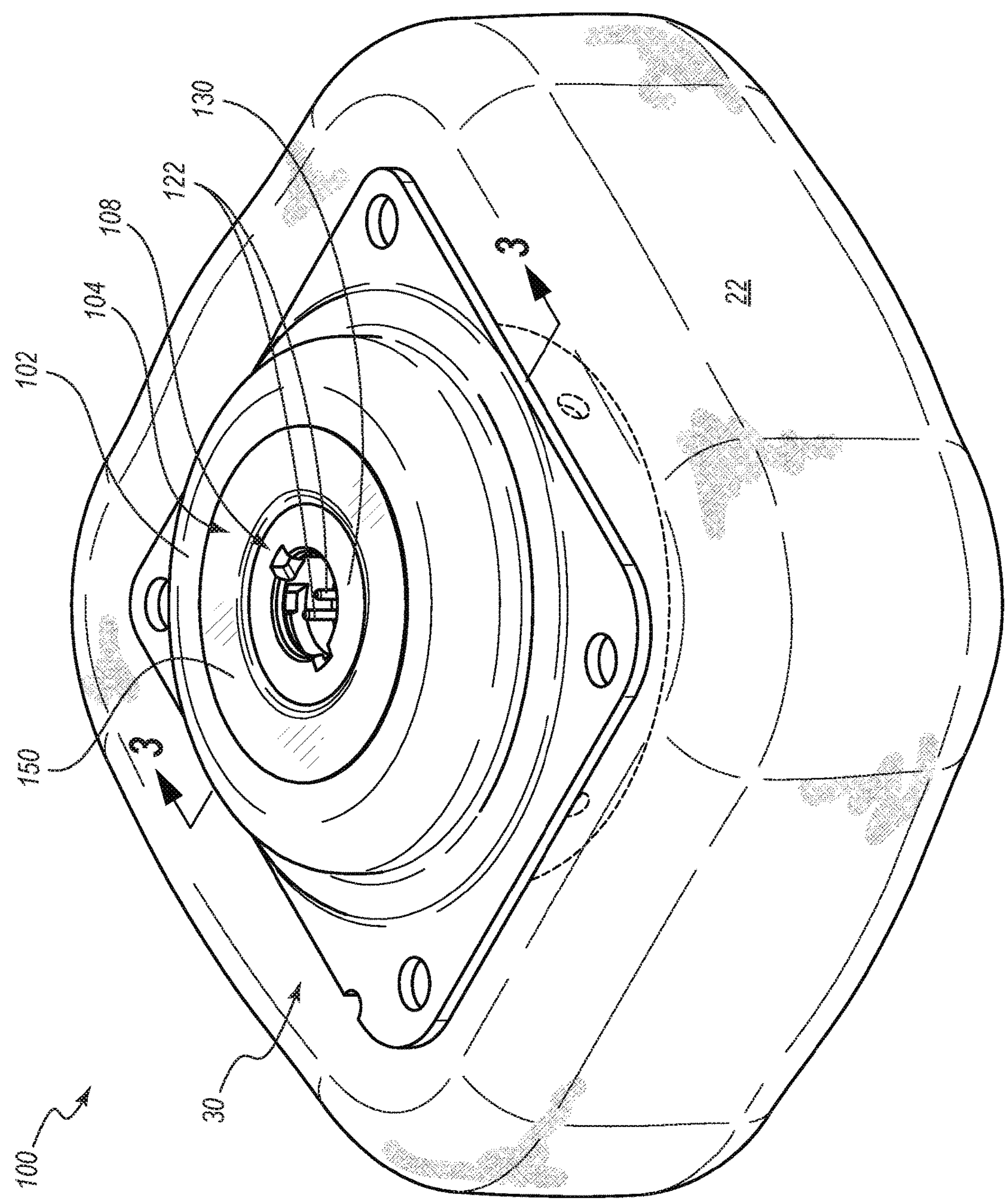
FIG. 2 is a rear perspective view of an airbag and an inflator having a seal system, according to an embodiment of the present disclosure.

FIG. 2 is a rear perspective view of the inflator 30 including a seal system 100. The inflatable cushion 22 is shown, in an at least partially inflated state, for reference. The inflator 30 can include an inflator base 102, and the inflator base 102 can include an connector pocket 104. The connector pocket 104 can further include an initiator aperture (not shown, but see, e.g., the initiator aperture 106 in FIG. 3). An overmold 130 (e.g., a polymeric overmold 130) can pass through and be coupled to the inflator 30 at or adjacent the connector pocket 104 and/or the initiator aperture 106. In some embodiments, the overmold 130 can be coupled to the inflator base 102 and an electrical connector socket 108, for example, at a position between each of the inflator base 102 and the electrical connector socket 108. An initiator (see, e.g., the initiator 110 in FIG. 3) may be coupled to the electrical connector socket 108. Two electrical conductors 122 of the initiator 110 are shown for reference. In other embodiments, the electrical connector socket 108 may include another suitable number of electrical conductors (e.g., one, three, four, etc.) coupled to the initiator 110. As illustrated, a membrane seal 150 may be coupled to at least a portion of the polymeric overmold 130 and/or the inflator base 102. For example, the membrane seal 150 may be coupled at a position between each of the overmold 130 and the inflator base 102.

Figure 3:
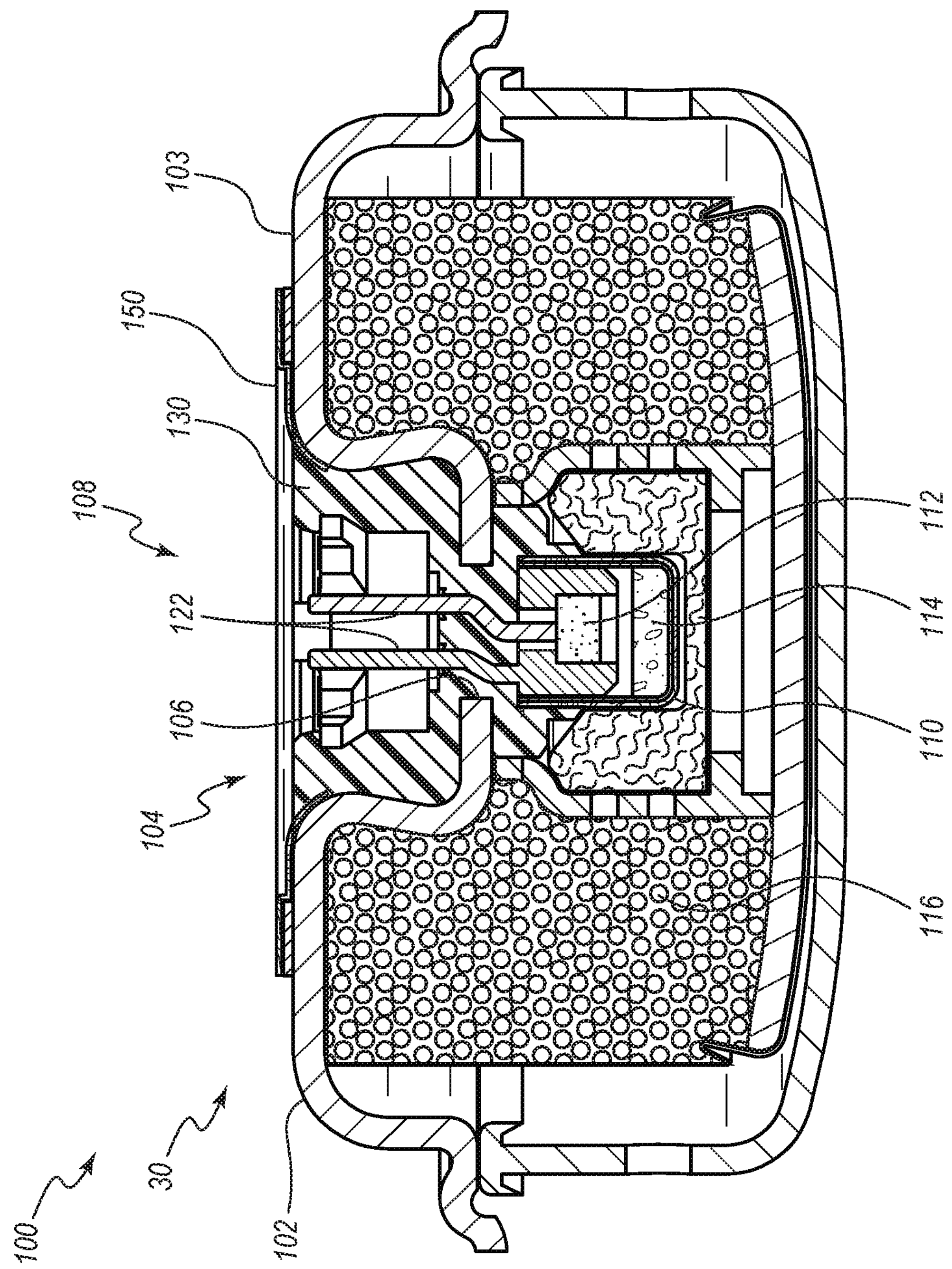
FIG. 3 is a cross sectional view of the inflator of FIG. 2 along line 3-3 of FIG. 2, according to an embodiment of the present disclosure.

FIG. 3 is a cross sectional view of the inflator 30 along line 3-3 of FIG. 2. The inflator 30 can include the initiator 110 and a secondary pyrotechnic load 114. The initiator 110 may comprise a primary pyrotechnic load 112, secondary pyrotechnic load 114 and/or the electrical conductors 122. In a collision event, an electrical signal may be passed or sent to the initiator 110 via the electrical conductors 122. The electrical signal may pass through a bridgewire across a distal end of the electrical conductors 122 so as to ignite the primary pyrotechnic load 112. The primary pyrotechnic load 112 may then ignite the secondary pyrotechnic load 114 which, in turn, may ignite a gas-generating reactant 116. The initiator 110 may be coupled (e.g., fixedly coupled), at least partially, by at least a portion of the overmold 130 to the inflator base 102 secondary pyrotechnic load 114.

The overmold 130 may also form at least a portion of the electrical connector socket 108 so as to couple the electrical conductors 122 of the initiator 110 to an electrical connector (not shown). The membrane seal 150 may be coupled to at least a portion of an exterior surface 103 of the inflator base 102, and can surround or be disposed around at least a portion of the connector pocket 104 so as to be coupled between at least a portion of the overmold 130 and the inflator base 102. As shown, the membrane seal 150 is at least partially disposed between each of the connector pocket 104 of the inflator base 102 and the overmold 130.

While the inflator 30 of FIGS. 1-3 is of a style commonly referred to as a disk style inflator, the present disclosure may be used with other types of inflators (e.g., tubular inflators) for any kind of airbag. Furthermore, while the present disclosure refers to an inflator having an initiator, inflators having more than one initiator are also within the scope of this disclosure.

Figure 4B:
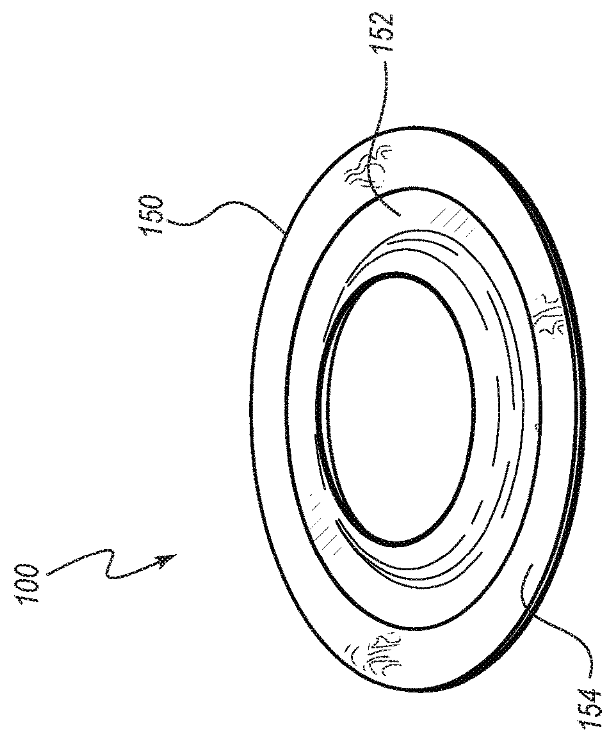
FIG. 4B is a perspective view of the membrane seal of FIG. 4A.
Figure 4A:
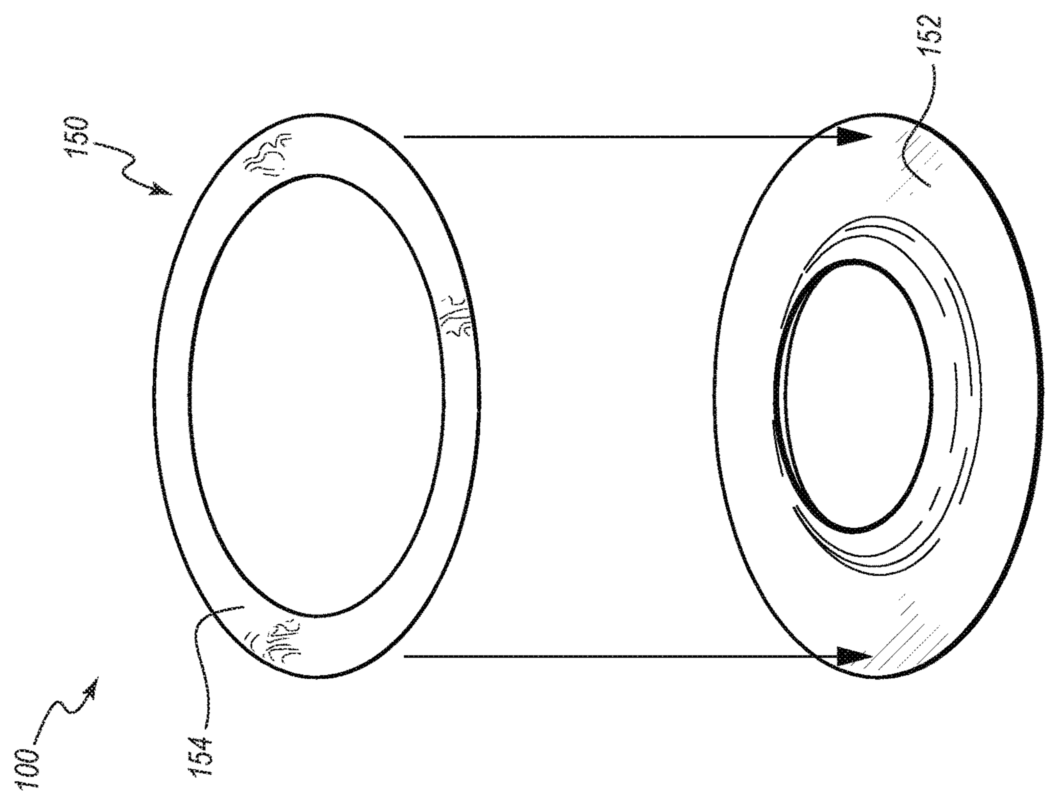
FIG. 4A is an exploded perspective view of a membrane seal of a seal system, according to an embodiment of the present disclosure.

FIG. 4A shows an exploded view of the membrane seal 150 of the seal system 100. The membrane seal 150 can include a substrate 152 (e.g., a polymeric substrate 152) and a bonding film or an adhesive film 154. The polymeric substrate 152 may be formed from one or more of a polyamide (nylon) member such as PA6 nylon film, or other thermoplastic or thermoset material. Other suitable materials for forming the polymeric substrate 152 are also within the scope of this disclosure. The adhesive film 154 may be formed of, but not limited to, high strength flexible nitrile phenolic-based thermoplastic bonding film, or any other suitable adhesive heat or compression bonding member. The polymeric substrate 152 and the adhesive film 154 may be formed in an annular or a ring-like shape, wherein the polymeric substrate 152 and the adhesive film 154 may have a similar outside diameter. The polymeric substrate 152 may be flat or preformed (e.g., shaped as shown in FIG. 4A) prior to coupling to the inflator base 102. The polymeric substrate 152 and adhesive film 154 may be coupled together such that the outside diameters align, or substantially align, to form the membrane seal 150. In some embodiments, the outside diameters of the polymeric substrate 152 and the adhesive film 154 may differ. For example, the outside diameter of the polymeric substrate 152 may be greater than the outside diameter of the adhesive film 154.

FIG. 4B is a perspective view of the membrane seal 150 of the seal system 100. As depicted, the polymeric substrate 152 and adhesive film 154 have been coupled together in a coupled configuration such that the outside diameters of the polymeric substrate 152 and adhesive film 154 are substantially aligned. An adhesive surface of the adhesive film 154 may couple the adhesive film 154 and the polymeric substrate 152 to form the membrane seal 150. Furthermore, the adhesive surface of the adhesive film 152 may aid in maintaining the membrane seal 150 as a single or unitized component until further coupled to or installed onto the inflator base (see, e.g., the inflator base 102 of FIGS. 5A and 5B). The membrane seal 150 includes a central opening or an aperture. The central opening or aperture of the membrane seal 150 may be configured to align, conform to, and/or otherwise correspond with the connector pocket 104 and/or initiator aperture 106 of the inflator base 102. (see FIGS. 3, 5) Furthermore, the central opening or aperture of the membrane seal 150 may be configured to encircle, conform, or otherwise correspond to the overmold 130 of an initiator 110.

Figure 5B:
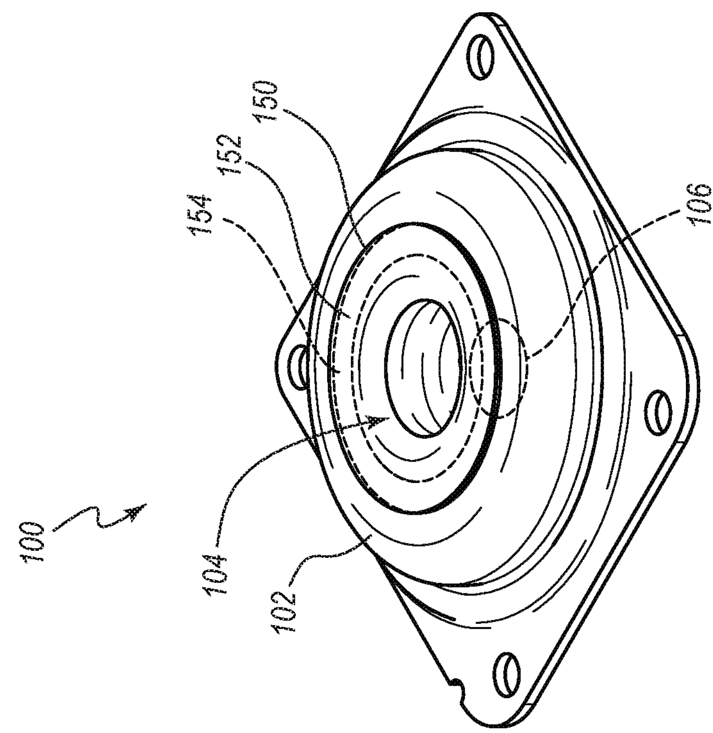
FIG. 5B is a perspective view of the seal system of FIG. 5A coupled to an inflator base.
Figure 5A:
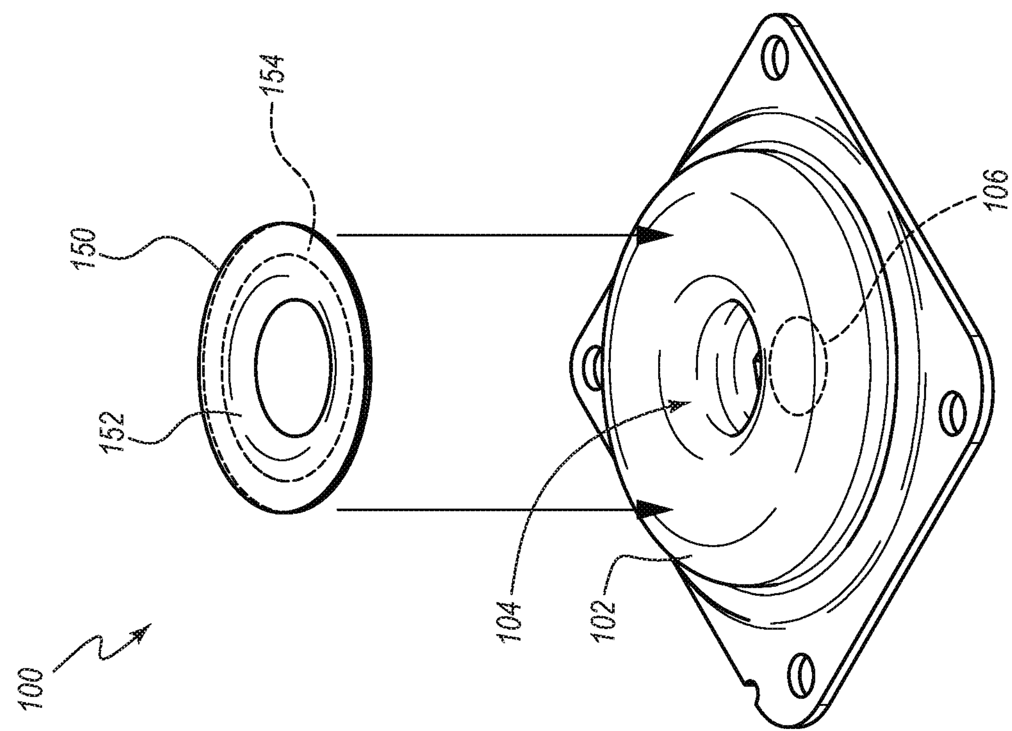
FIG. 5A is a partially exploded perspective view of a seal system, according to an embodiment of the present disclosure.

FIG. 5A is a partially exploded perspective view of the seal system 100. The membrane seal 150, including the polymeric substrate 152 coupled to the adhesive film 154, may be coupleable or configured to be coupled to the inflator base 102. The membrane seal 150 may be concentrically, or substantially concentrically, aligned with the connector pocket 104. In some embodiments, the adhesive film 154 may be coupled to (e.g., pressed onto) at least a portion of the inflator base 102, with the polymeric substrate 152 then applied to the adhesive film 154. The adhesive film 154 may be heated or reheated (either before or after application of the polymeric substrate 152) to bond, or at least partially bond, the adhesive film 154 to the inflator base 102. By way of example, in one embodiment, the polymeric substrate 152 may be adhered to the inflator base 102 by a contact adhesive means. In one embodiment, the inflator base 102 may be heated causing polymeric substrate 152 to adhere to the inflator base 102. In one embodiment, a mold process may be employed whereby clamp force and heating combine to adhere to the polymeric substrate 152 to the inflator base 102.

FIG. 5B is a perspective view of the seal system 100 assembled onto or coupled to the inflator base 102. With the membrane seal 150 coupled to the inflator base 102, the polymeric substrate 152 and the adhesive film 154 may be disposed concentrically, or substantially concentrically, in relation to each other. Furthermore, the polymeric substrate 152 and the adhesive film 154 may be disposed concentrically, or substantially concentrically, in relation to the connector pocket 104 of the inflator base 102.

Figure 6:
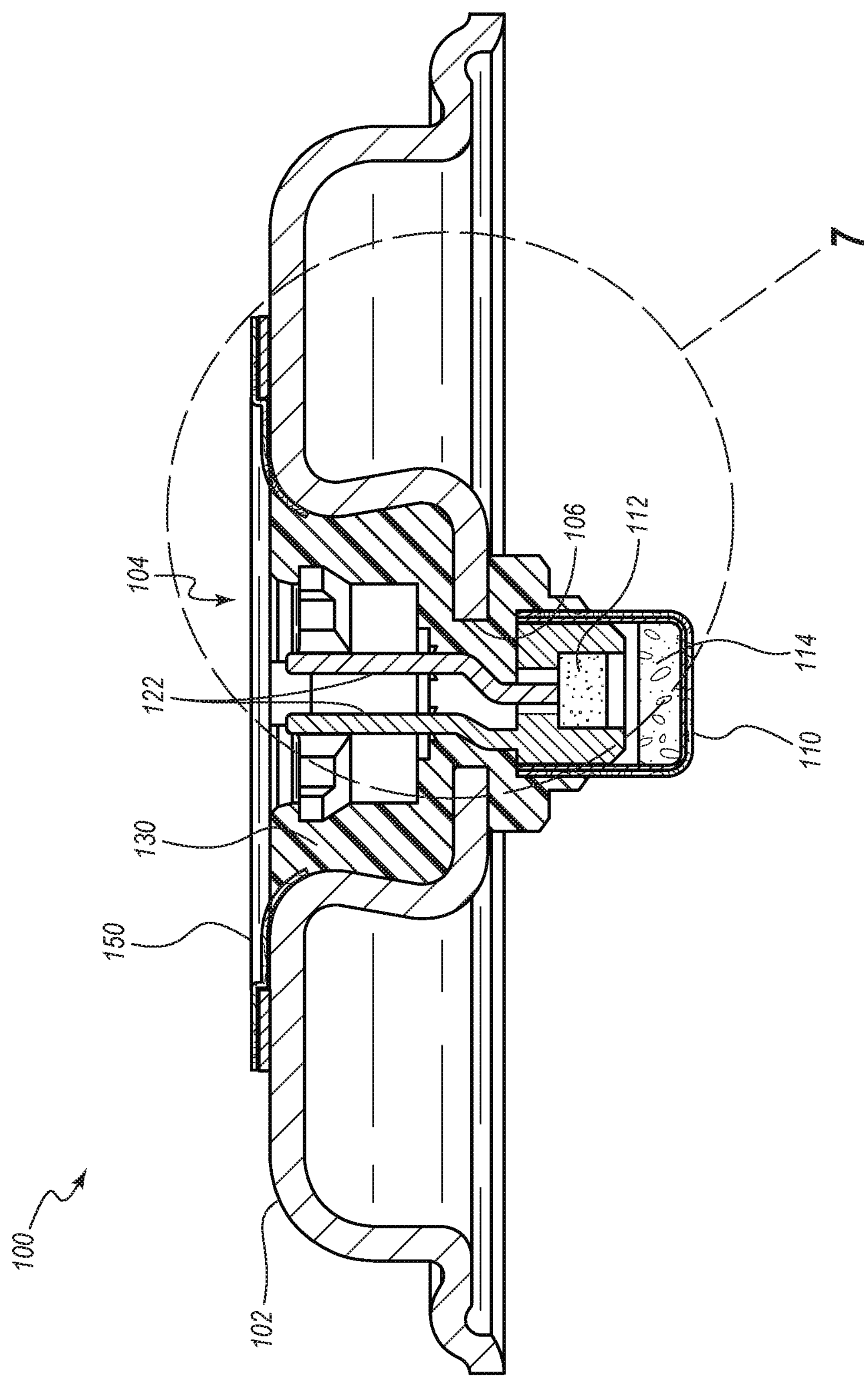
FIG. 6 is a partial cross sectional side view of a seal system including a membrane seal coupled to an inflator base and an initiator, according to an embodiment of the present disclosure.

FIG. 6 is a cross sectional side view of the membrane seal 150 assembled onto or coupled to the inflator base 102 and initiator 110. The primary pyrotechnic load 112, the secondary pyrotechnic load 114, and the electrical conductors 122 of the initiator 110 are shown for reference. As illustrated, the initiator 110 has been partially disposed or passed through the connector pocket 104, the initiator aperture 106, and a central opening or aperture of the membrane seal 150. The overmold 130 can be assembled onto or coupled to the inflator base 102 by application of heat (e.g., via injection molding) so as to couple the membrane seal 150 to the inflator base 102 and to dispose or fix the initiator 110 within the connector pocket 104 and the initiator aperture 106. The injection molding used to assemble the overmold 130 to the inflator base 102 may cause the adhesive film 154 to melt, or at least partially melt, and to form a bond to a surface of the inflator base 102 and to the polymeric substrate 152. Additionally, the injection molding of the overmold 130 may cause the polymeric substrate 152 to melt, or at least partially melt, and form a bond (e.g., a solid state bond) between at least a portion of the polymeric substrate 152 and at least a portion of the overmold 130.

The overmold 130 may be formed from an engineering thermoplastic nylon, such as, e.g., acrylonitrile-butadiene-styrene (ABS), polycarbonate (PC), or polymethyl methacrylate (PMMA). The polymeric substrate (see 152 in FIGS. 5A, 7B) may be formed of a nylon compatible to the particular engineering thermoplastic nylon of the overmold 130. By way of example without limitation, an overmold 130 of ABS may be coupled with a polymeric substrate 152 of ABS, ABS/PC, PMMA, or styrene acrylonitrile (SAN). Similarly, an overmold 130 of PC may be coupled with a polymeric substrate 152 of ABS/PC, polybutylene terephthalate (PBT), PC, PC/PBT, or PMMA. Likewise, an overmold 130 of PMMA may be coupled with a polymeric substrate 152 of ABS, ABS/PC, PC, PC/PBT, PMMA, or SAN. Other material combinations are also contemplated by this disclosure.

Figure 7A:
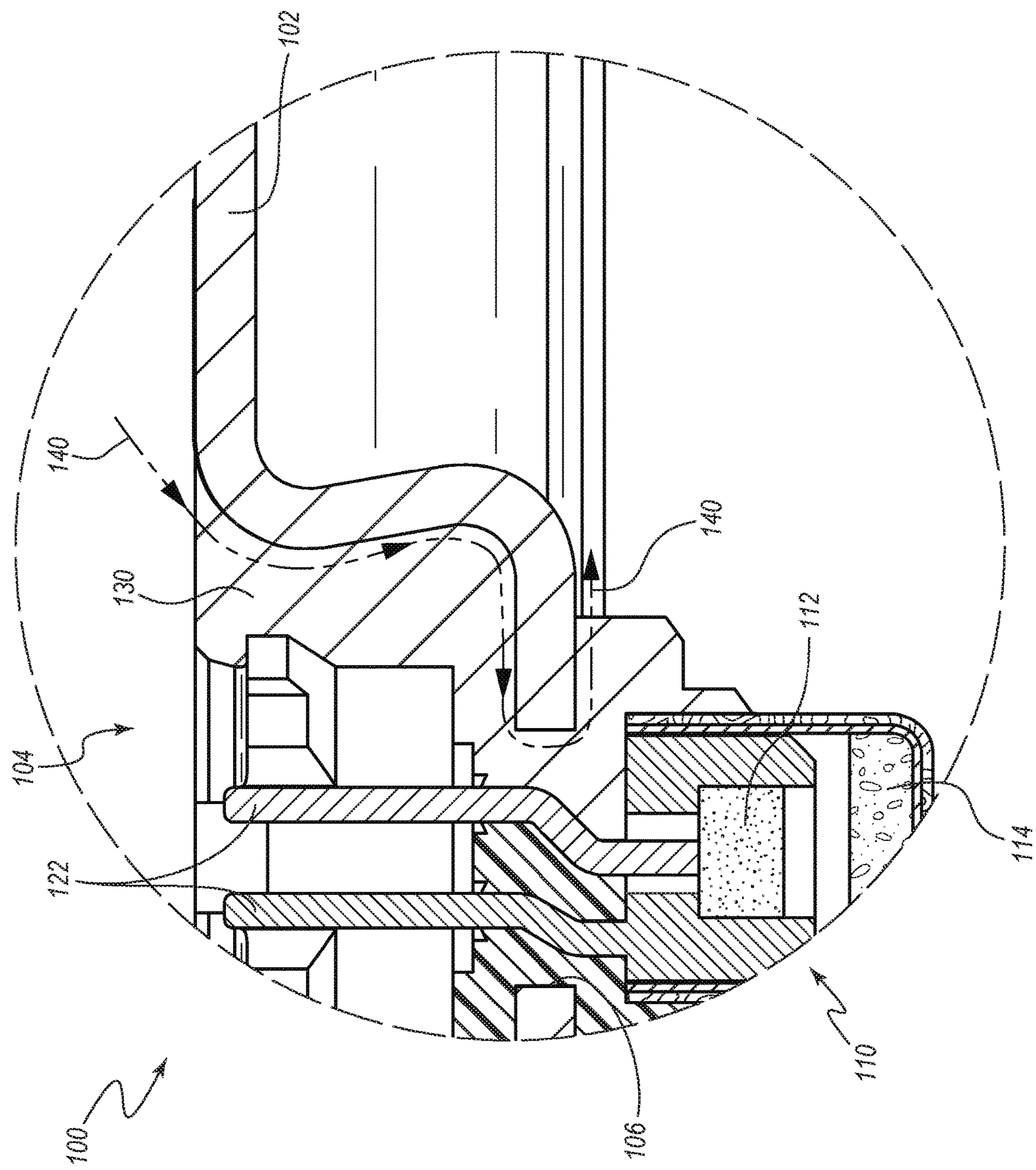
FIG. 7A is a detailed cross sectional view of a portion of the inflator base and the initiator without the membrane seal along line 7 of FIG. 6.

FIG. 7A is a detailed cross sectional view of a portion of an initiator-inflator assembly 100 without the seal system of FIG. 6. The area shown in FIG. 7A is identified by line 7 in FIG. 6. An initiator 110, a primary pyrotechnic load 112, a secondary pyrotechnic load 114, and electrical conductors 122 of the initiator 110 are shown for reference. An overmold 130 may be employed to fixedly dispose the initiator 110 within an connector pocket 104 and an initiator aperture 106. Without the membrane seal 150 of the present disclosure, a leak, depicted by arrow 140, of gas and/or liquid (e.g., air and/or moisture) may be present. As illustrated, the leak 140 may extend or pass along an interface between the overmold 130 and the inflator base 102. Any gas and/or liquid that may flow into or enter the interior of the airbag inflator may interfere with the proper operation of the airbag inflator.

Figure 7B:
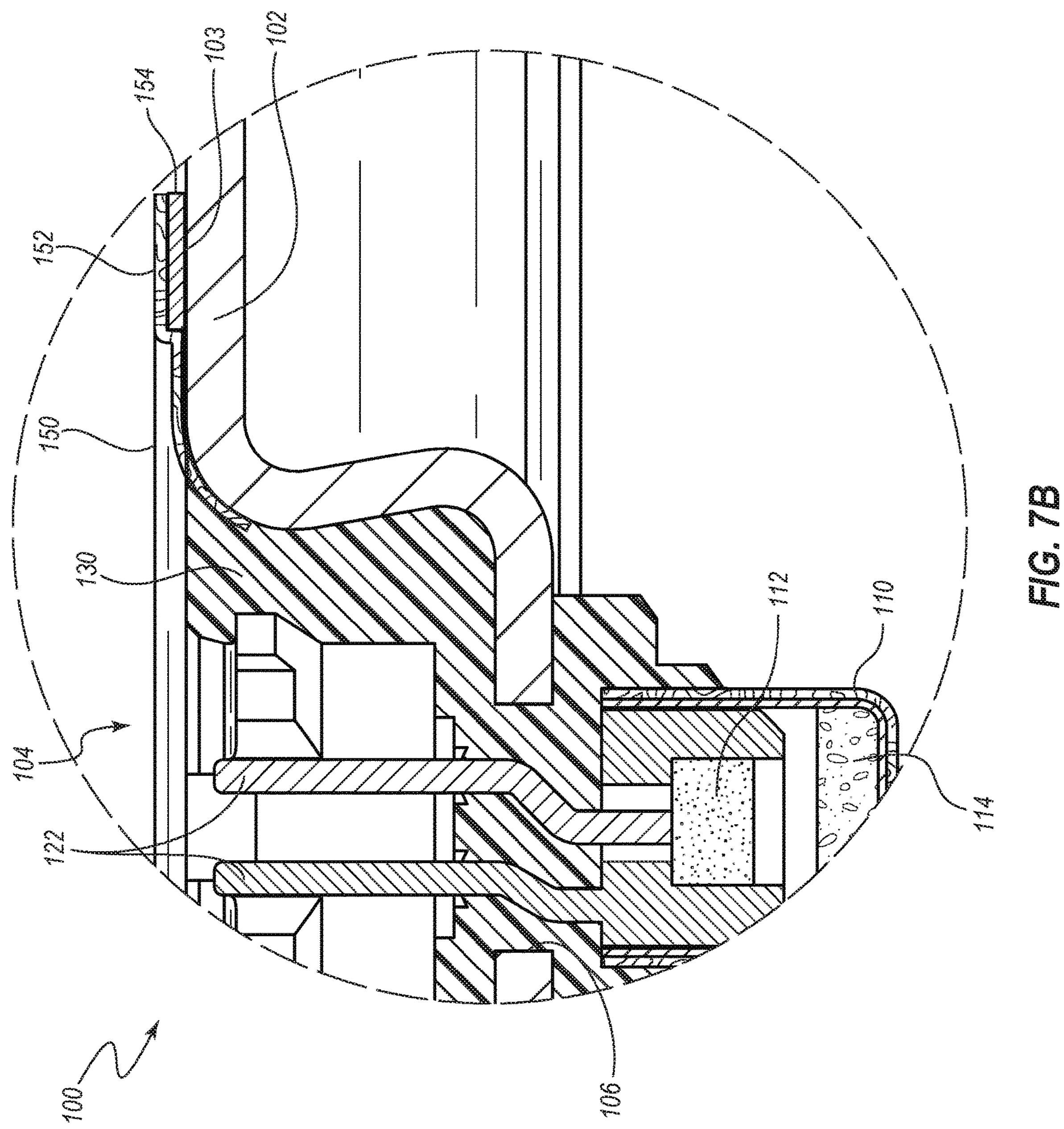
FIG. 7B is a detailed cross sectional view of a portion of the inflator base and the initiator with the membrane seal along line 7 of FIG. 6.

FIG. 7B is a detailed cross sectional view of a portion of the seal system 100. The primary pyrotechnic load 112, secondary pyrotechnic load 114, and electrical conductors 122 of the initiator 110 are shown for reference. At least a portion of the initiator 110 can be disposed through the connector pocket 104 and the initiator aperture 106 of the inflator base 102. The membrane seal 150 may be disposed concentrically, or substantially concentrically, around the connector pocket 104 and may be coupled between a portion of an exterior surface 103 of the inflator base 102 and a portion of the overmold 130. Stated another way, the membrane seal 150 may be disposed such that the membrane seal 150 at least partially surrounds the initiator aperture 106 and/or the initiator 110 when positioned and then bonded via a heat molding process.

The overmold 130 may be assembled onto or coupled to at least a portion of the inflator base 102 and the initiator 110. In some embodiments, the polymeric overmold 130 may be coupled to the inflator base 102. The injection molding process may cause at least a portion of the polymeric substrate 152 of the membrane seal 150 to melt and, by melting, to form a bond (e.g., a solid state bond) between the polymeric substrate 152 and the overmold 130. The injection molding process may also cause or result in at least a portion of the adhesive film 154 melting and thereby forming a bond between the adhesive film 154 and the polymeric substrate 152, and/or forming a bond between the adhesive film 154 and the surface of the inflator base 102. The bond(s) may create, form, or generate a seal between an external environment and an interior area enclosed within the inflator (see, e.g., the inflator 30 of FIGS. 2 and 3). In various embodiments, the bond(s) may create, form, or generate or form a seal (e.g., a hermetic seal) between the exterior environment and the interior of the inflator 30 whereby gas and/or liquid may be prevented or limited from entering the interior of the inflator 30.

In some embodiments, the seal may inhibit, prevent, or resist the passage of gas (e.g., air). In certain embodiments, the seal may inhibit, prevent, or resist the passage of liquid (e.g., moisture or water). The seal may inhibit, prevent, or resist the passage of an object from an interior of the inflator to an exterior of the inflator. The seal may inhibit, prevent, or resist passage of an object from an exterior of the inflator to in interior of the inflator.

The seal may be submersible in a liquid to a predetermined depth (e.g., 1 meter, 2 meters, 3 meters, etc.) and may inhibit, prevent, or resist the passage of the liquid from the exterior of the inflator to the interior of the inflator. In various embodiments, the seal may be submersible in the liquid for a period of time (e.g., 1 hour, 1 day, 1 week, etc.) and may maintain the seal. The seal may be configured to inhibit, prevent, or resist gas and/or liquid from entering into the inflator through a space disposed between the base and the overmold and/or the initiator. By way of additional example, the nature of the seal may be such that a helium tracer leak test may be employed against a test embodiment. A helium tracer leak test includes helium injected into an assembled and otherwise sealed inflator base and diffuser, such that the helium is trapped within the inflator base/diffuser assembly, and a vacuum is externally applied. Transmission of helium to the exterior of the inflator base/diffuser assembly is measured. A target transmission rate of helium through the seal may be less than 0.0001 cubic centimeters per second at one standard ATM of 100% helium concentration inside the inflator at 20 degrees Celsius In other embodiments, the seal created between the overmolded nylon and the nylon substrate may be a fusion bond.

In some embodiments, a sealed airbag inflator may include a base, an initiator partially disposed within the base, an overmold coupling the base to the initiator, and/or a membrane seal comprising a substrate and an adhesive film, the membrane seal coupled to the base via the adhesive film, and the substrate coupled to the overmold such that the membrane seal forms a seal between the base and the overmold. The seal between the base and the overmold may inhibit, prevent, or resist passage of gas and/or liquid from an exterior of the sealed airbag inflator to an interior of the sealed airbag inflator. For example, the seal between the base and the overmold may inhibit, prevent, or resist passage of gas and/or liquid between the base and the overmold.

In certain embodiments, the adhesive film may be coupled to an exterior surface of the base. The base may include an aperture such that the initiator is disposed through the aperture, and wherein the overmold is disposed between the base and the initiator to couple to the base and to the initiator at the aperture. A portion of the overmold can be configured to be melted such that the overmold partially fills the aperture. Moreover, upon melting of the portion of the overmold, the overmold can form a seal between the base and the initiator. The seal between the base and the initiator may inhibit, prevent, or resist passage of gas and/or liquid from an exterior of the sealed airbag inflator to an interior of the sealed airbag inflator between the base and the initiator.

The sealed airbag inflator may further include a bond between the adhesive film and the base. The sealed airbag inflator may further include a solid state bond between the substrate and the overmold. Furthermore, the bond and the solid state bond can form a seal between an interior of the sealed airbag inflator and an exterior of the sealed airbag inflator. The seal between the interior of the sealed airbag inflator and the exterior of the sealed airbag inflator can inhibit, prevent, or resist passage of gas and/or liquid from the exterior of the sealed airbag inflator to the interior of the sealed airbag inflator.

The overmold may be formed from at least one thermoplastic or thermoset material, such as, e.g., nylon. The substrate may be a polymeric substrate formed from at least one of a polyamide or another thermoplastic or thermoset material. The adhesive film may be formed from at least one of a thermal bonding film and contact bonding film, or a combination thereof.

In certain embodiments, a membrane seal for an airbag inflator may include a substrate and an adhesive film coupled to the substrate, wherein the membrane seal is to be coupled to a portion of a base of an airbag inflator. Moreover, when the membrane seal is coupled to the base, the adhesive film can couple the membrane seal to an exterior surface of the base such that the membrane seal is disposed around at least a portion of an aperture of the base of the airbag inflator. The aperture can receive a portion of the initiator.

The adhesive film, when coupled to the base, may form a bond to the base. The substrate may be meltable such that during coupling of the substrate to the base, the substrate forms a solid state bond with an overmold coupling the initiator to the base. Moreover, the bond between the base and the adhesive film and the solid state bond between the substrate and the overmold can form a seal between an interior of the inflator and an exterior of the inflator. For example, the seal between the interior of the inflator and the exterior of the inflator can inhibit, prevent, or resist passage of gas and/or liquid from an exterior of the inflator to an interior of the inflator between the base of the inflator and an overmold of a connector.

In various embodiments, the substrate and the adhesive film may be annular, square-shaped, triangular, or non-traditionally shaped. Other suitable shapes of the substrate and/or the adhesive film are also within the scope of this disclosure. An aperture or opening may extend between a mid-portion of each of the substrate and the adhesive film. In some embodiments, a method of sealing an aperture of an airbag inflator base through which an initiator is passed may include (i) coupling an adhesive film of a membrane seal around at least a portion of the aperture of the airbag inflator base, (ii) coupling a substrate of the membrane seal between a surface of the airbag inflator base and an overmold, wherein the substrate and the overmold at least partially melt during coupling of the initiator to the airbag inflator base via the overmold such that the substrate and the overmold form a solid state bond, and (iii) forming a bond between the airbag inflator base and the adhesive film. The bond between the adhesive film and the airbag inflator base and the solid state bond between the substrate and the overmold can form a seal at the aperture. In certain embodiments, the seal at the aperture can be a hermetic seal. Furthermore, the seal at the aperture may inhibit, prevent, or resist passage of gas and/or liquid from an exterior of the airbag inflator to an interior of the airbag inflator. In certain embodiments, forming the bond comprises heating and cooling the membrane seal. In certain embodiment, forming the bond comprises, during assembly to the airbag inflator base, pressing the membrane seal against the airbag inflator base such that the adhesive film adhesively bonds to the airbag inflator base. In certain embodiment, forming the bond comprises heating the airbag inflator base to inductively heat the membrane seal to bond the adhesive film to the airbag inflator base. In certain embodiment, forming the bond comprises, during assembly, coupling the membrane seal to the airbag inflator base and the overmold is injection molded against the airbag inflator base so as to apply a clamping force and heat to bond the membrane seal to the airbag inflator base and the overmold.

Throughout this specification, "couples" (including couples to, couples at, couples with, etc.) refers to any form of interaction between two or more entities, including mechanical, electrical, magnetic, electromagnetic, fluid, and thermal interaction. Two components may be coupled to each other even though they are not in direct contact with each other.

The terms "a" and "an" can be described as one, but not limited to one. For example, although the disclosure may recite an inflator having an initiator, the disclosure also contemplates that the inflator can have more than one initiator.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Elements recited in means-plus-function format are intended to be construed in accordance with 35 U.S.C. § 112 ¶ 6. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. A membrane seal for an airbag inflator, the membrane seal comprising:

a substrate forming an aperture to correspond to one or more of a recess and an aperture of a base of an airbag inflator; and an adhesive configured to bond the membrane seal substrate to an exterior surface of the base such that the membrane seal is disposed around at least a portion of the aperture of the base of the airbag inflator, and wherein the aperture receives at least a portion of an initiator, wherein the adhesive is disposed away from the aperture.

2. The membrane seal of claim 1, wherein the adhesive is an adhesive film.

3. The membrane seal of claim 2, wherein the substrate and the adhesive film are annular in shape.

4. The membrane seal of claim 3, wherein an aperture extends between a mid-portion of each of the substrate and the adhesive film.

5. The membrane seal of claim 2, wherein the adhesive film is formed from a thermal bonding film.

6. The membrane seal of claim 1, wherein the substrate is meltable such that the substrate is configured to form a solid state bond with an overmold coupling the initiator to the base.

7. The membrane seal of claim 6, wherein the bond between the base and the substrate with the adhesive and the solid state bond between the substrate and the overmold form a seal between an interior of the inflator and an exterior of the inflator.

8. The membrane seal of claim 7, wherein the seal between the interior of the inflator and the exterior of the inflator inhibits passage of gas or liquid from an exterior of the inflator to an interior of the inflator.

9. The membrane seal of claim 1, wherein the substrate is a polymeric substrate formed from a polyamide.

10. A sealed airbag inflator, comprising:

a base;

an initiator at least partially disposed within the base;

an overmold coupling the base to the initiator; and a membrane seal comprising a substrate and an adhesive, the membrane seal coupled to the base via the adhesive, and the substrate coupled to the overmold such that only a portion of the membrane seal forms a seal between the base and the overmold.

11. The sealed airbag inflator of claim 10, wherein, during assembly, the substrate at least partially melts between the base and the overmold and resolidifies to bond with the overmold.

12. The sealed airbag inflator of claim 10, wherein the seal between the base and the overmold inhibits passage of gas or liquid from an exterior of the sealed airbag inflator to an interior of the sealed airbag inflator.

13. The sealed airbag inflator of claim 10, wherein the seal between the base and the overmold inhibits passage of gas or liquid between the base and the overmold.

14. The sealed airbag inflator of claim 10, wherein the adhesive is an adhesive film formed from a thermal bonding film, a contact bonding film, or a combination thereof.

15. The sealed airbag inflator of claim 10, wherein the base comprises an aperture such that the initiator is at least partially disposed through the aperture, and wherein the overmold is disposed between the base and the initiator to couple to the base and to the initiator at the aperture.

16. The sealed airbag inflator of claim 15, wherein a portion of the overmold is configured to be melted such that the overmold partially fills the aperture.

17. The sealed airbag inflator of claim 16, wherein, upon melting of the portion of the overmold, the overmold forms a seal between the base and the initiator.

18. The sealed airbag inflator of claim 17, wherein the seal between the base and the initiator inhibits passage of gas or liquid from an exterior of the sealed airbag inflator to an interior of the sealed airbag inflator between the base and the initiator.

19. The sealed airbag inflator of claim 10, further comprising a solid state bond between the substrate and the overmold such that a seal is formed between an interior of the sealed airbag inflator and an exterior of the sealed airbag inflator.

20. The sealed airbag inflator of claim 19, wherein the seal formed between the interior of the sealed airbag inflator and the exterior of the sealed airbag inflator inhibits passage of gas or liquid from the exterior of the sealed airbag inflator to the interior of the sealed airbag inflator.

21. The sealed airbag inflator of claim 10, wherein the overmold is formed of a thermoplastic nylon, and the substrate is a polymeric substrate formed from a nylon compatible with the thermoplastic nylon.

* * * * *